US011866384B2

(12) United States Patent
Hocking et al.

(10) Patent No.: US 11,866,384 B2
(45) Date of Patent: Jan. 9, 2024

(54) COMPOSITIONS AND THEIR USE IN AGRICULTURAL APPLICATIONS

(71) Applicant: SYNSUS PRIVATE LABEL PARTNERS, LLC, Houston, TX (US)

(72) Inventors: Douglas Hocking, San Marcos, CA (US); Robert Munion, San Marcos, CA (US)

(73) Assignee: SYNSUS PRIVATE LABEL PARTNERS, LLC, Houston, TX (US)

(*) Notice: Subject to any disclaimer, the term of this patent is extended or adjusted under 35 U.S.C. 154(b) by 210 days.

(21) Appl. No.: 17/400,155

(22) Filed: Aug. 12, 2021

(65) Prior Publication Data

US 2021/0371352 A1 Dec. 2, 2021

Related U.S. Application Data

(63) Continuation of application No. 16/552,588, filed on Aug. 27, 2019, now Pat. No. 11,124,462.

(60) Provisional application No. 62/723,379, filed on Aug. 27, 2018.

(51) Int. Cl.
| | |
|---|---|
| *C05G 3/90* | (2020.01) |
| *C05C 3/00* | (2006.01) |
| *C05C 1/00* | (2006.01) |
| *C05C 9/00* | (2006.01) |
| *C05G 5/20* | (2020.01) |
| *C07F 9/22* | (2006.01) |
| *C05G 3/00* | (2020.01) |

(52) U.S. Cl.
CPC ............. *C05G 3/90* (2020.02); *C05C 1/00* (2013.01); *C05C 3/005* (2013.01); *C05C 9/00* (2013.01); *C05C 9/005* (2013.01); *C05G 3/00* (2013.01); *C05G 5/20* (2020.02); *C07F 9/224* (2013.01)

(58) Field of Classification Search
CPC ... C05G 3/90; C05G 3/00; C05G 5/20; C05G 5/30; C05G 5/37; C05C 1/00; C05C 3/005; C05C 9/00; C05C 9/005; C05C 1/02; C07F 9/224; Y02P 60/21
See application file for complete search history.

(56) References Cited

U.S. PATENT DOCUMENTS

| | | | |
|---|---|---|---|
| 3,152,039 A | 10/1964 | Mattson | |
| 3,353,949 A | 11/1967 | Nau | |
| 3,425,819 A | 2/1969 | Barry et al. | |
| 3,986,859 A | 10/1976 | Molinet | |
| 4,530,714 A | 7/1985 | Kolc et al. | |
| 4,943,307 A | 7/1990 | Detre et al. | |
| 5,024,689 A | 6/1991 | Sutton et al. | |
| 5,071,463 A | 12/1991 | Narayanan et al. | |
| 5,160,528 A | 11/1992 | Chaudhuri et al. | |
| 5,352,265 A | 10/1994 | Weston et al. | |
| 5,354,726 A | 10/1994 | Narayanan et al. | |
| 5,364,438 A | 11/1994 | Weston et al. | |
| 5,435,821 A | 7/1995 | Duvdevani et al. | |
| 5,698,003 A | 12/1997 | Omilinsky et al. | |
| 6,262,183 B1 | 7/2001 | Domb et al. | |
| 6,830,603 B2 | 12/2004 | Whitehurst et al. | |
| 7,615,232 B2 | 11/2009 | Wurtz et al. | |
| 8,048,189 B2 | 11/2011 | Whitehurst et al. | |
| 8,133,294 B2 | 3/2012 | Whitehurst et al. | |
| 8,603,211 B2 | 12/2013 | Rahn et al. | |
| 9,056,804 B2 | 6/2015 | Phillip et al. | |
| 9,732,008 B2 | 8/2017 | McKnight et al. | |
| 11,124,462 B1 | 9/2021 | Hocking et al. | |
| 2003/0211943 A1 | 11/2003 | Harwell | |
| 2004/0163434 A1 | 8/2004 | Quin | |
| 2006/0185411 A1 | 8/2006 | Hojjatie et al. | |
| 2007/0077428 A1 | 4/2007 | Hamed et al. | |
| 2007/0157689 A1 | 7/2007 | Sutton et al. | |
| 2007/0295047 A1 | 12/2007 | Sutton | |
| 2008/0173053 A1* | 7/2008 | Sanders | C05G 5/23 525/418 |
| 2010/0206030 A1 | 8/2010 | Whitehurst et al. | |
| 2010/0206031 A1 | 8/2010 | Whitehurst et al. | |
| 2010/0218575 A1 | 9/2010 | Wissemeier et al. | |
| 2011/0154874 A1 | 6/2011 | Ran et al. | |
| 2011/0233474 A1 | 9/2011 | Cigler et al. | |
| 2011/0259068 A1 | 10/2011 | Whitehurst et al. | |
| 2011/0314883 A1 | 12/2011 | Whitehurst et al. | |
| 2013/0125321 A1 | 5/2013 | Newbould et al. | |
| 2013/0145806 A1 | 6/2013 | Iannotta | |
| 2013/0276495 A1 | 10/2013 | Sutton et al. | |
| 2014/0037570 A1 | 2/2014 | Whitehurst | |
| 2014/0047881 A1 | 2/2014 | Roberts | |

(Continued)

FOREIGN PATENT DOCUMENTS

| | | | |
|---|---|---|---|
| CN | 101200400 A | | 6/2008 |
| CN | 101391919 A | | 3/2009 |
| CN | 103086799 A | * | 5/2013 |
| EP | 2266400 A1 | | 12/2010 |
| GB | 1371694 A | | 10/1974 |
| NZ | 586790 A | | 6/2012 |
| WO | 9722568 A1 | | 6/1997 |

(Continued)

OTHER PUBLICATIONS

Material Safety Data Sheet, Agrotain Ultra, Revised Feb. 2010, 3 pages.

(Continued)

*Primary Examiner* — Jennifer A Smith

(74) *Attorney, Agent, or Firm* — Carter, DeLuca & Farrell LLP

(57) ABSTRACT

Compositions include dicyandiamide (DCD), N-(N-butyl) Thiophosphoric Triamide (NBPT), and styrene-maleic anhydride copolymer in a solution. Agricultural fertilizer compositions contain the DCD, NBPT and styrene-maleic anhydride copolymer composition in combination with a fertilizer.

8 Claims, No Drawings

(56) References Cited

U.S. PATENT DOCUMENTS

| | | |
|---|---|---|
| 2014/0047882 A1 | 2/2014 | Gabrielson et al. |
| 2014/0047883 A1 | 2/2014 | Gabrielson |
| 2014/0060132 A1 | 3/2014 | Roberts |
| 2014/0174140 A1 | 6/2014 | Ortiz-Suarez |
| 2018/0002244 A1 | 1/2018 | Bobeck |
| 2018/0312447 A1 | 11/2018 | McKnight |

FOREIGN PATENT DOCUMENTS

| | | | |
|---|---|---|---|
| WO | 2008000196 A1 | 1/2008 | |
| WO | 2013071344 A1 | 5/2013 | |
| WO | 2013090324 A1 | 6/2013 | |
| WO | WO-2017195173 A1 * | 11/2017 | ............... C05C 1/00 |

OTHER PUBLICATIONS

Safety Data Sheet, Koch Agronomic Services, LLC, Version No. 03, dated Mar. 22, 2012, 7 pages.

Material Safety Data Sheet, 1,2-Propanediol CAS No. 57-55-6, CDH (cdhfinechemical.com), 6 pages.

* cited by examiner

COMPOSITIONS AND THEIR USE IN AGRICULTURAL APPLICATIONS

CROSS-REFERENCE TO RELATED APPLICATIONS

The present application is a continuation of U.S. application Ser. No. 16/552,588, filed on Aug. 27, 2019, and claims the benefit of and priority to U.S. Provisional Patent Application Ser. No. 62/723,379, filed on Aug. 27, 2018, the entire contents of which are incorporated by reference herein.

TECHNICAL FIELD

This disclosure relates to compositions containing dicyandiamide, N-(N-butyl) thiophosphoric triamide, and styrene-maleic anhydride copolymer in a solution, agricultural fertilizer compositions including the compositions described herein, and the use of such compositions.

BACKGROUND

In the agrochemical industry, farmers use various fertilizers to impart macronutrients to plants either by application to the soil or application to plant leaves. Nitrogen, phosphorus, potassium, calcium, magnesium, and sulfur are macronutrients that may be supplied to the plants and soil manually by farmers. In many crops, the amount of nitrogen supplied is critical to the overall quality and growth of the crop.

Nitrogen is typically supplied in the form of nitrogenous, i.e., nitrogen precursor-containing, fertilizer compounds, such as urea, ammonium nitrate, or ammonium phosphate fertilizer compounds. However, due to the high water solubility of these salts, applied nitrogen values are lost due to run-off and leaching of the nitrogenous fertilizer compounds. Once applied, the nitrogenous fertilizer compounds are typically degraded to nitrogenous species such as $NH_4^+$, $NO_2^-$, $NO_3^-$, and ammonia gas, which are even more readily lost through evaporation, run-off, and leaching.

If degradation of the fertilizer compounds occurs at a rate that is faster than the nitrogenous degradation products can be used by the plants, then the nitrogen values in the degradation products are at increased risk of being lost.

Nitrification and/or urease inhibitors reduce the loss of nitrogenous degradation products by delaying degradation of fertilizer. The use of nitrification and/or urease inhibitors in combination with nitrogenous fertilizer compounds tends to increase the amount of time the nitrogen source remains in the soil and available for absorption by the plants, which increases the effectiveness of the fertilizer thereby positively impacting crop yield and quality.

Aqueous end use fertilizer solutions are typically prepared in the field by diluting commercially available concentrated fertilizer compositions with water. Commonly used concentrated fertilizer compositions include concentrated ammonium nitrate compositions, such as, for example, UAN 18, UAN 28, UAN 30 and UAN 32.

Dicyandiamide is useful as a nitrification inhibitor in such aqueous end use fertilizer compositions, but has very low solubility in water making it difficult to incorporate into the aqueous end use fertilizer compositions. N-(N-butyl) Thiophosphoric Triamide is a solid, waxy compound that decomposes with water making it difficult to incorporate with other materials. Provided herein are solutions to these problems.

SUMMARY

In various embodiments, compositions for use in agricultural applications include from about 10% to about 25% dicyandiamide (DCD); from about 10% to about 25% N-(N-butyl) Thiophosphoric Triamide (NBPT); and from about 1% to about 20% styrene-maleic anhydride copolymer.

In some embodiments, the composition further includes from about 1% to about 65% dimethyl sulfoxide (DMSO) and/or from about 1% to about 65% monoethanolamine (MEA).

In some embodiments, the DCD is present in an amount from about 15% to about 20%. In specific embodiments, the DCD is present in an amount of about 17%.

In some embodiments, the NBPT is present in an amount from about 15% to about 20%. In specific embodiments, the NBPT is present in an amount of about 17%.

In some embodiments, the composition includes about 17% dicyandiamide (DCD); about 17% N-(N-butyl) Thiophosphoric Triamide (NBPT); from about 1% to about 20% styrene-maleic anhydride copolymer; from about 1% to about 65% dimethyl sulfoxide (DMSO); and from about 1% to about 65% monoethanolamine (MEA).

Also provided herein are methods for reducing the loss of nitrogen by run off and denitrification by adding an effective amount of a composition containing from about 10% to about 25% dicyandiamide (DCD); from about 10% to about 25% N-(N-butyl) Thiophosphoric Triamide (NBPT); from about 1% to about 20% styrene-maleic anhydride copolymer; from about 1% to about 65% dimethyl sulfoxide (DMSO); and from about 1% to about 65% monoethanolamine (MEA) to a fertilizer.

In some embodiments, the DCD is present in an amount from about 15% to about 20% and/or the NBPT is present in an amount from about 15% to about 20%.

In some embodiments, the composition used in the methods described herein is added to the fertilizer before use. In specific embodiments, the fertilizer is a liquid fertilizer. In various embodiments, the fertilizer is a nitrogen fertilizer. In specific embodiments, the nitrogen fertilizer is a urea fertilizer. In other embodiments, the fertilizer is a urea ammonium nitrate fertilizer. In one embodiment, the fertilizer is anhydrous ammonia.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments. All percentages are percentages by weight, unless indicated otherwise by the context.

DETAILED DESCRIPTION

Urease inhibitors can be used with a fertilizer (e.g., incorporated into a urea-containing fertilizer) to slow the conversion of ammonium to ammonia gas and thus slow the loss of ammonia to volatilization, thus making ammonium available to plants in the soil for longer periods of time.

Nitrification inhibitors can be used with a fertilizer (e.g., incorporated into a urea-containing fertilizer) to slow the process of ammonium conversion to nitrate, and subsequently the loss of nitrate to leeching, thus making ammonium available to plants in the soil for longer periods of time.

Ammonium is one of the main forms of nitrogen that can be utilized by plants. Increasing the amount of time that the nitrogen is available to the plant increases the effectiveness of the fertilizer which positively impacts crop yield and quality.

Fertilizers may be common water soluble inorganic fertilizers that provide nutrients such as phosphorus-based, nitrogen-based, potassium-based, or sulphur-based fertilizers. Examples of such fertilizers include: for nitrogen as the nutrient: nitrates and or ammonium salts such as ammonium nitrate, including in combination with urea e.g. as Uram type materials, anhydrous ammonia, calcium ammonium nitrate, ammonium suphate nitrate, ammonium phosphates, particularly mono-ammonium phosphate, di-ammonium phosphate and ammonium polyphosphate, ammonium thiosulfate, ammonium sulphate, and the less commonly used calcium nitrate, sodium nitrate, magnesium nitrate, potassium nitrate and ammonium chloride. It is understood that a fertilizer composition can include one or a combination of the fertilizers described herein.

Urase inhibitor NBPT (N-(n-butyl)-thiophosphoric triamide), however, faces drawbacks in its use as NBPT is extremely difficult to handle. NBPT is a sticky, waxy, heat and water sensitive material, which cannot be used in its solid form, as it is used at low concentrations making it difficult to evenly distribute on urea prills (i.e., large granules) and in soil.

In order to evenly distribute the NBPT onto the urea, the NBPT is dispersed into a carrier prior to being sprayed onto the urea. Thus, the use of a solvent system containing the NBPT is desirable as, in its liquid form, the solvent system is capable of distributing the NBPT into granular urea and into liquid fertilizers containing urea. By introducing the NBPT to liquid fertilizers containing urea in a solvent system, the NBPT is capable of being better dispersed in the liquid fertilizer.

Dicyandiamide is useful as a nitrification inhibitor in aqueous agricultural applications, e.g., end use fertilizer compositions, but similar to urease inhibitors faces similar drawbacks. Nitrification inhibitors, such as dicyandiamide, generally have very low solubility in water (about 41 grams per liter) and so it is difficult to incorporate into the aqueous end use fertilizer compositions, particularly under field conditions.

As nitrification inhibitors, such as dicyandiamide, have a generally low solubility, they are used at low concentrations in water making it difficult to evenly distribute on urea-containing prills and in soil. In order to evenly distribute the dicyandiamide onto the urea-containing prills or granules, dicyandiamide is dispersed into a solvent carrier prior to being sprayed onto the urea. Thus, the use of a solvent system containing dicyandiamide ("DCD") is desirable since, in its liquid form, the solvent system is capable of distributing the dicyandiamide onto urea granules or prills, urea ammonium nitrate granules or prills or, otherwise, urea-containing granules or prills, and into liquid fertilizers containing urea or urea ammonium nitrate.

By introducing the DCD to liquid fertilizers containing urea in a solvent system, the dicyandiamide is capable of being better dispersed in the liquid fertilizer.

In one embodiment, concentrated fertilizer compositions include concentrated ammonium nitrate compositions, such as, for example, UAN 18, UAN 28, UAN 30 and UAN 32.

It is desirable to have a solvent system containing dicyandiamide, that has a favorable toxicological and/or ecological profile and desirable characteristics in terms of low volatility, biodegradability or ready biodegradability (i.e., readily biodegradable), low toxicity or low hazard level.

In one aspect, the present disclosure relates to a composition for use in agricultural applications including from about 10% to about 25% dicyandiamide (DCD); from about 10% to about 25% N-(N-butyl) Thiophosphoric Triamide (NBPT); and from about 1% to about 20% styrene-maleic anhydride copolymer.

In some aspects, the composition further includes from about 1% to about 65% dimethyl sulfoxide (DMSO) and/or from about 1% to about 65% monoethanolamine (MEA).

In other specific aspects the DCD and NBPT are present in an amount from about 15% to about 20%, for example about 17%.

In other aspects, the composition includes from about 10% to about 25% dicyandiamide (DCD); from about 10% to about 25% N-(N-butyl) Thiophosphoric Triamide (NBPT); from about 1% to about 20% styrene-maleic anhydride copolymer; from about 1% to about 65% dimethyl sulfoxide (DMSO); and from about 1% to about 65% monoethanolamine (MEA).

Also provided herein are methods for reducing the loss of nitrogen by run off and denitrification by combining a fertilizer with an effective amount of a composition containing from about 10% to about 25% dicyandiamide (DCD); from about 10% to about 25% N-(N-butyl) Thiophosphoric Triamide (NBPT); from about 1% to about 20% styrene-maleic anhydride copolymer; from about 1% to about 65% dimethyl sulfoxide (DMSO); and from about 1% to about 65% monoethanolamine (MEA).

In a further aspect, the present disclosure is directed to a concentrated liquid fertilizer composition containing, based on 100 parts by weight of the composition: (a) up to about 99 parts by weight of one or more fertilizer compounds, (b) dicyandiamide, (c) N-(N-butyl) Thiophosphoric Triamide, (d) styrene-maleic anhydride copolymer, (e) dimethyl sulfoxide (f) and monoethanolamine.

Dicyandiamide is a known compound having the formula:

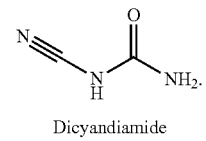

Dicyandiamide

Dicyandiamide, also known as "2-cyanoguanidine", is commercially available or can be made by treating cyanamide with a base.

In various embodiments, the dicyandiamide can be present in the composition at a lower range of 7%, or 9%, or 11% or 13% or 15%, or 17%, or 19% by weight of the composition. In another embodiment, the dicyandiamide can be present in the composition in an amount from about 7% by weight of the composition to about 25% by weight of the composition. In another embodiment, the dicyandiamide can be present in the composition in an amount from about 15% by weight of the composition to about 19% by weight of the composition.

The dicyandiamide can be present in the composition in an amount from about 0.5% by weight of the composition to about 50% by weight of the composition or, in another embodiment, can be present in the composition in an amount from about 1% by weight of the composition to about 40% by weight of the composition, and, in another embodiment, can be present in the composition in an amount from about 0.5% by weight of the composition to about 20% by weight of the composition. In one particular embodiment, the dicyandiamide is present in the composition in an amount from about 1% by weight of the composition to about 30% by weight of the composition.

N-(n-butyl)-Thiophosphoric Triamide ("NBPT") is a commercially available compound having the formula:

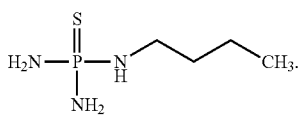

In various embodiments, the NBPT can be present in the composition at a lower range of 7%, or 9%, or 11% or 13% or 15%, or 17%, or 19% by weight of the composition. In another embodiment, the NBPT can be present in the composition in an amount from about 7% by weight of the composition to about 25% by weight of the composition. In another embodiment, the NBPT can be present in the composition in an amount from about 15% by weight of the composition to about 19% by weight of the composition.

The NBPT can be present in the composition in an amount from about 0.5% by weight of the composition to about 50% by weight of the composition or, in another embodiment, can be present in the composition in an amount from about 1% by weight of the composition to about 40% by weight of the composition, and, in another embodiment, can be present in the composition in an amount from about 0.5% by weight of the composition to about 20% by weight of the composition. In one particular embodiment, the NBPT is present in the composition in an amount from about 1% by weight of the composition to about 30% by weight of the composition.

Styrene-maleic anhydride copolymer is a thermoplastic resin produced by the copolymerization of styrene and maleic anhydride. It is commercially available and has the following structure:

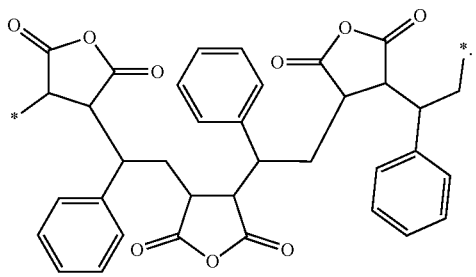

In various embodiments, the styrene-maleic anhydride copolymer can be present in the composition at a lower range of 1%, or 4%, or 8% or 12% or 16%, or 20%, or 24% by weight of the composition. In another embodiment, the styrene-maleic anhydride copolymer can be present in the composition in an amount from about 1% by weight of the composition to about 20% by weight of the composition. In another embodiment, the styrene-maleic anhydride copolymer can be present in the composition in an amount from about 5% by weight of the composition to about 20% by weight of the composition.

The styrene-maleic anhydride copolymer can be present in the composition in an amount from about 0.5% by weight of the composition to about 30% by weight of the composition or, in another embodiment, can be present in the composition in an amount from about 0.5% by weight of the composition to about 20% by weight of the composition, and, in another embodiment, can be present in the composition in an amount from about 5% by weight of the composition to about 15% by weight of the composition. In one particular embodiment, the styrene-maleic anhydride copolymer is present in the composition in an amount from about 1% by weight of the composition to about 20% by weight of the composition.

In various embodiments, the fertilizer compound is treated with the composition by contacting the composition described herein (e.g., a composition containing nitrification inhibitor, urease inhibitor, and styrene-maleic anhydride copolymer) in solid or liquid form.

Suitable fertilizers include nitrogenous fertilizers, for example those containing a nitrogenous compound such as urea, nitrate salts, ammonium salt, or a mixture thereof, such as ammonium nitrate, ammonium sulfate, ammonium thiosulfate, ammonium polysulfide, ammonium phosphates, ammonium chloride, ammonium bicarbonate, anhydrous ammonia, calcium nitrate, nitrate soda, calcium cyanamide. In some embodiments, the nitrogenous fertilizer contain ammonium nitrate. Suitable ammonium nitrate-containing fertilizers include, for example, UAN 18, UAN 28, and UAN 30.

In one embodiment, the fertilizer composition is in solid particulate form, and contacting of the fertilizer composition with a composition described herein is conducted by spraying the composition in accordance with the present disclosure on the particles of solid fertilizer.

In one embodiment, the end use fertilizer composition is made by combining a composition of in accordance with the present disclosure with a solid fertilizer to form a solid nitrification-inhibited fertilizer composition and subsequently dissolving the solid nitrification-inhibited fertilizer composition in an aqueous medium, e.g. water.

In one embodiment, the fertilizer compound is in liquid form and contacting of the fertilizer composition with the inhibitor composition is conducted by mixing the inhibitor composition with the liquid fertilizer composition.

In one embodiment, an end use fertilizer composition in accordance with the present disclosure is made by combining a inhibitor composition in accordance with the present disclosure with a concentrated nitrogenous fertilizer to form a concentrated liquid nitrification-inhibited fertilizer composition and subsequently diluting the concentrated liquid nitrification-inhibited fertilizer composition with an aqueous medium.

In one embodiment, an end use fertilizer composition in accordance with the present disclosure is made by combining an inhibitor composition in accordance with the present disclosure, a solid or concentrated liquid fertilizer, and an aqueous medium.

Compositions in accordance with the present disclosure provide improved ease of handling of dicyandiamide and NBPT, improved solubility characteristics, low toxicity of the organic solvents; good storage characteristics, and excellent miscibility with aqueous compositions, such as aqueous nitrogenous fertilizer formulations.

EXAMPLE 1

A mixer, equipped with an electric mixer that has three prop-style mixing blades in series on a central shaft is used to produce a composition in accordance with the present disclosure. The tank itself is a stainless-steel cone-bottom tank with a 33 degree slope with a set of four baffles to allow for turbulent laminar flow.

36% w/w of dimethyl sulfoxide and 15% w/w of styrene-maleic anhydride copolymer are added to the tank, heated to 160° F., and mixed for one hour or until dissolved. 17% dicyandiamide is then added, and mixing continued for another hour or until dissolved. 15% monoethanolamine (MEA) is added with stirring and the resulting solution is allowed to cool to 100° F. Once cooled, 17% N-(N-butyl) Thiophosphoric Triamide (NBPT) is added with mixing for 45 minutes or until dissolved. The resulting solution is passed through a 5 micron filter, and samples are taken from both the top and the bottom of the reactor for testing. The resulting solution is reddish-orange and has a sulfur-like odor.

EXAMPLE 2

A mixer, equipped with an electric mixer that has three prop-style mixing blades in series on a central shaft is used to produce a composition in accordance with the present disclosure. The tank itself is a stainless-steel cone-bottom tank with a 33 degree slope with a set of four baffles to allow for turbulent laminar flow.

40.99% w/w of dimethyl sulfoxide and 10% w/w of styrene-maleic anhydride copolymer are added to the tank, heated to 160° F., and mixed for one hour or until dissolved. 0.01% FD&C Blue #1, 17% dicyandiamide, and 15% monoethanolamine (MEA) are then added, and mixing continued for another hour or until dissolved. The resulting solution is allowed to cool to 100° F. and then, 17% N-(N-butyl) Thiophosphoric Triamide (NBPT) is added with mixing for 45 minutes or until dissolved. The resulting solution is passed through a 5 micron filter, and samples are taken from both the top and the bottom of the reactor for testing. The resulting solution is blue and has a sulfur-like odor.

EXAMPLE 3

A mixer, equipped with an electric mixer that has three prop-style mixing blades in series on a central shaft is used to produce a composition in accordance with the present disclosure. The tank itself is a stainless-steel cone-bottom tank with a 33 degree slope with a set of four baffles to allow for turbulent laminar flow.

30.99% w/w of dimethyl sulfoxide and 20% w/w of styrene-maleic anhydride copolymer are added to the tank, heated to 160° F., and mixed for one hour or until dissolved. 0.01% FD&C Blue #1, 17% dicyandiamide, and 15% monoethanolamine (MEA) are then added, and mixing continued for another hour or until dissolved. The resulting solution is allowed to cool to 100° F., and then 17% N-(N-butyl) Thiophosphoric Triamide (NBPT) is added with mixing for 45 minutes or until dissolved. The resulting solution is passed through a 5 micron filter, and samples are taken from both the top and the bottom of the reactor for testing. The resulting solution is blue and has a sulfur-like odor.

EXAMPLE 4

A mixer, equipped with an electric mixer that has three prop-style mixing blades in series on a central shaft is used to produce a composition in accordance with the present disclosure. The tank itself is a stainless-steel cone-bottom tank with a 33 degree slope with a set of four baffles to allow for turbulent laminar flow.

41% w/w of dimethyl sulfoxide and 10% w/w of styrene-maleic anhydride copolymer are added to the tank, heated to 160° F., and mixed for one hour or until dissolved. 17% dicyandiamide, and 15% monoethanolamine (MEA) are then added, and mixing continued for another hour or until dissolved. The resulting solution is allowed to cool to 100° F., and then 17% N-(N-butyl) Thiophosphoric Triamide (NBPT) is added with mixing for 45 minutes or until dissolved. The resulting solution is passed through a 5 micron filter, and samples are taken from both the top and the bottom of the reactor for testing. The resulting solution is reddish-orange and has a sulfur-like odor.

The compositions and methods described herein are presently representative of embodiments, exemplary, and not intended as limitations on the scope of the disclosure. Changes therein and other uses will occur to those skilled in the art. Such changes and other uses can be made without departing from the scope of the invention as set forth in the claims.

The invention claimed is:

1. A composition for use in agricultural applications comprising:
   a. from about 1 to about 20% by weight styrene-maleic anhydride copolymer; and
   b. from about 10 to about 25% by weight N-(N-butyl) Thiophosphoric Triamide (NBPT).

2. The composition of claim 1, further comprising from about 1 to about 65% by weight dimethyl sulfoxide (DMSO).

3. The composition of claim 1 further comprising from about 1 to about 65% by weight monoethanolamine (MEA).

4. The composition of claim 1, wherein the NBPT is present in an amount from about 15 to about 20% by weight.

5. A method for reducing the loss of nitrogen by run off and denitrification comprising adding an effective amount of a composition including from about 10 to about 25% by weight N-(N-butyl) Thiophosphoric Triamide (NBPT); and from about 1 to about 20% by weight styrene-maleic anhydride copolymer to a fertilizer.

6. The method of claim 5, wherein the NBPT is present in an amount from about 15 to about 20% by weight.

7. The method of claim 5, wherein the composition is added to the fertilizer before use.

8. The method of claim 5, wherein the fertilizer is a nitrogen fertilizer.

\* \* \* \* \*